(12) United States Patent
Naseer-Ul-Islam et al.

(10) Patent No.: US 12,096,300 B2
(45) Date of Patent: Sep. 17, 2024

(54) DETERMINING HANDOVER COMMAND TRANSMISSION BASED ON SURVIVAL TIME

(71) Applicant: Nokia Technologies Oy, Espoo (FI)

(72) Inventors: Muhammad Naseer-Ul-Islam, Munich (DE); Ömer Bulakci, Munich (DE); Ahmad Awada, Munich (DE); Jedrzej Stanczak, Wroclaw (PL); Srinivasan Selvaganapathy, Bangalore (IN); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/263,917

(22) PCT Filed: Jan. 28, 2022

(86) PCT No.: PCT/EP2022/052032
§ 371 (c)(1),
(2) Date: Aug. 2, 2023

(87) PCT Pub. No.: WO2022/167335
PCT Pub. Date: Aug. 11, 2022

(65) Prior Publication Data
US 2024/0049091 A1  Feb. 8, 2024

(30) Foreign Application Priority Data

Feb. 3, 2021 (IN) .............................. 202141004707

(51) Int. Cl.
*H04W 36/24* (2009.01)
*H04W 36/26* (2009.01)
(Continued)

(52) U.S. Cl.
CPC ......... *H04W 36/249* (2023.05); *H04W 36/26* (2013.01); *H04W 36/302* (2023.05); *H04W 36/00837* (2018.08)

(58) Field of Classification Search
CPC .... H04L 1/1825; H04L 1/1887; H04W 28/04; H04W 28/0252; H04W 36/249;
(Continued)

(56) References Cited

U.S. PATENT DOCUMENTS

| | | | |
|---|---|---|---|
| 2020/0236579 A1 | 7/2020 | Cho et al. | |
| 2022/0330049 A1* | 10/2022 | Tan | H04L 1/08 |
| 2023/0088622 A1* | 3/2023 | Shimoda | H04W 68/12 |
| | | | 455/458 |

FOREIGN PATENT DOCUMENTS

| | | |
|---|---|---|
| CN | 107135553 A | 9/2017 |
| CN | 108617037 B | 8/2020 |

(Continued)

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104, V17.4.0, Sep. 2020, pp. 1-76.

(Continued)

*Primary Examiner* — Nam T Huynh
(74) *Attorney, Agent, or Firm* — SQUIRE PATTON BOGGS (US) LLP (57) ABSTRACT

Disclosed is a method comprising evaluating a survival time status of a terminal device, determining a handover command transmission based at least partly on the survival time status, and transmitting the handover command to the terminal device based on the determining.

4 Claims, 6 Drawing Sheets

(51) Int. Cl.
*H04W 36/30* (2009.01)
*H04W 36/00* (2009.01)
(58) Field of Classification Search
CPC ............... H04W 36/26; H04W 36/302; H04W 36/00837; H04W 36/00838; H04W 36/0069; H04W 36/0072
See application file for complete search history.

(56) References Cited

FOREIGN PATENT DOCUMENTS

| WO | 2020/089851 A1 | 5/2020 |
|---|---|---|
| WO | 2020/259206 A1 | 12/2020 |

OTHER PUBLICATIONS

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V1.3.0, Nov. 2020, pp. 1-88.

"Time Synchronization Signalling and Mobility Impact Analysis", 3GPP TSG-RAN WG2 Meeting #113 Electronic, R2-2100716, Agenda: 8.5.2, Nokia, Jan. 25-Feb. 5, 2021, 5 pages.

"Msc-generator", Sourceforge, Jun. 12, 2019, archived webpage available at : http://web.archive.org/web/20190612221703/https://sourceforge.net/projects/msc-generator/.

"Reducing mobility interruption time in 5G networks", Ericsson, Apr. 2, 2020, Webpage available at : https://www.ericsson.com/en/blog/2020/4/reducing-mobility-interruption-time-5g-networks#:~:text=Tomorrow's%205G%20ultra%2Dreliable%20low,handover%20in%204G%20LTE%20systems.

International Search Report and Written Opinion received for corresponding Patent Cooperation Treaty Application No. PCT/EP2022/052032, dated May 23, 2022, 14 pages.

"Discussion on RAN3 Impact of TSC QoS", 3GPP TSG-RAN WG3 #104, R3-192277, Agenda: 17.3, China Telecom, May 13-17, 2019, 3 pages.

"Discussion on Data interruption during mobility", 3GPP TSG-RAN WG3 #111-e, R3-210778, Agenda: 21.2, CATT, Jan. 25-Feb. 4, 2021, 2 pages.

"RAN enhancements based on new QoS related parameters", 3GPP TSG-RAN WG2 Meeting #113-e , R2-2100216, Agenda: 8.5.4, Huawei, Jan. 25-Feb. 5, 2021, 7 pages.

"3rd Generation Partnership Project; Technical Specification Group Radio Access Network; NR; Radio Resource Control (RRC) protocol specification (Release 16)", 3GPP TS 38.331, Jan. 7, 2021, pp. 1-473.

Nokia et al, "(TP for NR_IIOT_URLLC_enh BL CR for TS 38.423) Survival Time and handover", vol. RAN WG3, No. Online; Nov. 1, 2021-Nov. 11, 2021, 3GPP Draft; R3-214830, 3rd Generation Partnership Project (3GPP), Mobile Competence Centre ; 650, Route Des Lucioles ; F-06921 Sophia-Antipolis Cedex ; France.

* cited by examiner

DETERMINING HANDOVER COMMAND TRANSMISSION BASED ON SURVIVAL TIME

RELATED APPLICATION

This application claims priority to PCT Application No. PCT/EP2022/052032, filed on Jan. 28, 2022, which claims priority to IN Application No. 202141004707, filed on Feb. 3, 2021, each of which is incorporated herein by reference in its entirety.

FIELD

The following exemplary embodiments relate to wireless communication.

BACKGROUND

In a handover procedure, a cellular transmission may be transferred from one base station to another. However, if the handover is not timed appropriately, it may lead to a negative impact on the quality of the cellular transmission. Therefore, it is desirable to provide an improved handover procedure.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: evaluate a survival time status of a terminal device; determine a handover command transmission based at least partly on the survival time status; and transmit the handover command to the terminal device based on the determining.

According to another aspect, there is provided an apparatus comprising means for: evaluating a survival time status of a terminal device; determining a handover command transmission based at least partly on the survival time status; and transmitting the handover command to the terminal device based on the determining.

According to another aspect, there is provided a method comprising evaluating a survival time status of a terminal device; determining a handover command transmission based at least partly on the survival time status; and transmitting the handover command to the terminal device based on the determining.

According to another aspect, there is provided a computer program comprising instructions for causing an apparatus to perform at least the following: evaluate a survival time status of a terminal device; determine a handover command transmission based at least partly on the survival time status; and transmit the handover command to the terminal device based on the determining.

According to another aspect, there is provided a computer readable medium comprising program instructions for causing an apparatus to perform at least the following: evaluate a survival time status of a terminal device; determine a handover command transmission based at least partly on the survival time status; and transmit the handover command to the terminal device based on the determining.

According to another aspect, there is provided a non-transitory computer readable medium comprising program instructions for causing an apparatus to perform at least the following: evaluate a survival time status of a terminal device; determine a handover command transmission based at least partly on the survival time status; and transmit the handover command to the terminal device based on the determining.

According to another aspect, there is provided a system comprising at least a first base station, a second base station, and a terminal device. The first base station is configured to: evaluate a survival time status of the terminal device; determine a handover command transmission based at least partly on the survival time status; and transmit the handover command to the terminal device based on the determining, wherein the handover command comprises an indication for the terminal device to perform a handover from the first base station to the second base station.

According to another aspect, there is provided a system comprising at least a first base station, a second base station, and a terminal device. The first base station comprises means for: evaluating a survival time status of the terminal device; determining a handover command transmission based at least partly on the survival time status; and transmitting the handover command to the terminal device based on the determining, wherein the handover command comprises an indication for the terminal device to perform a handover from the first base station to the second base station.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G) or beyond (such as 6G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
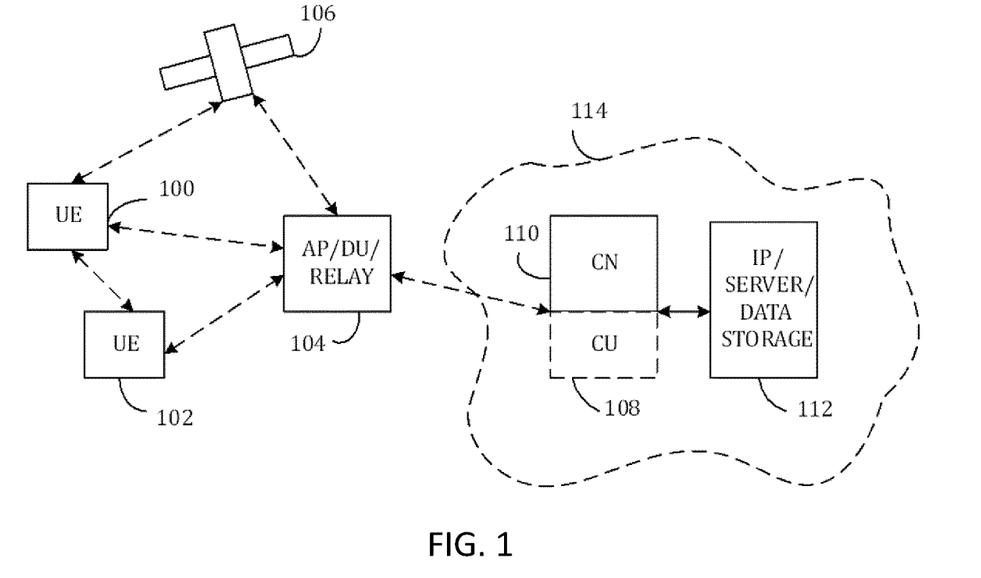
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a central unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Ultra-reliable low-latency communication (URLLC) is a 5G communication service that provides low latency and high reliability for latency-sensitive applications, such as factory automation, the industrial internet of things (IIoT), and autonomous driving. The quality of service (QoS) requirements for such applications may comprise requirements such as survival time, service reliability, service availability, and transfer interval.

Survival time may be defined as the time that an application consuming a communication service may continue without an anticipated message. In other words, survival time may be defined as the time period that is tolerated by the application without communication service. Survival time may be expressed as a time period or, for example in the case of cyclic traffic, as the maximum number of consecutive incorrectly received or lost messages. After the survival time expires, the receiver may, for example, shut down the receiver operation due to safety measures.

As an example, the survival time information may be included in the time sensitive communications (TSC) assistance information (TSCAI) per QoS flow, which is provided from the 5G core network (5GC) to the RAN. The survival time information can be obtained via the application function (AF), and it can be provided to the session management function (SMF). The survival time can be utilized by the RAN to handle the QoS requirements of a service. The survival time is service-dependent and may vary, for example, in the order of two times the transfer interval value. Transfer interval may be defined as the time difference between two consecutive transfers of application data from an application via the service interface to the communication system. The survival time information may be obtained by (radio) access network, (R)AN, from core network (CN). There may also be other means of obtaining the survival time information, for example from a device or user equipment (UE) or by network configuration, for example from a management entity.

Figure 2:
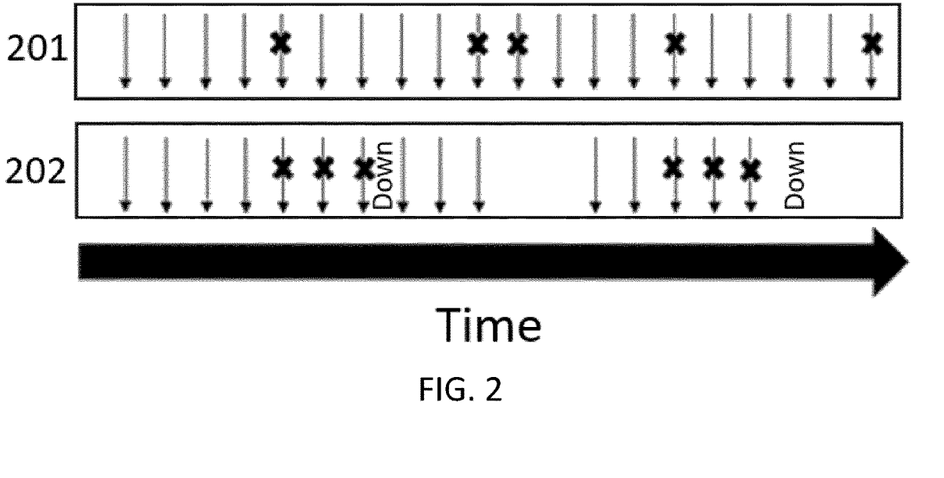
FIG. 2 illustrates survival time.

FIG. 2 illustrates the concept of survival time and the tolerance of packet loss within survival time requirements with cyclic traffic. In FIG. 2, an exemplary packet flow is provided, where the survival time is equal to three consecutive packet errors. In the first example illustrated in block 201, since fewer than three consecutive packet errors are experienced, the service stays in the up state. In other words, one or two errors can be tolerated by the service. However, in the second example illustrated in block 202, when the service experiences three consecutive packet errors, the service enters the down state, which may result in production being stopped, for example. It is noted that, in this example, survival time is based on consecutive packet errors. Nevertheless, other means for defining the survival time can also be utilized, for example in terms of absolute time.

A benefit of the survival time awareness in a 5G system is that the 5G system can provide an overall packet error ratio (PER) that matches better with the actual application requirements, and improves network efficiency for URLLC/TSC traffic flows. If the survival time is known, the 5G system may use a lower target PER most of the time, and switch to a higher target PER if the survival time is about to be exceeded. For example, in the case of a service with an overall PER of 1e-8 (QoS profile), the 5G system may use a lower target PER of 1e-3 for approximately 99.9% of the time, and a higher target PER of 1e-8 for approximately 0.1% of the time. On the other hand, if the survival time is not known, the 5G system may use a target PER of 1e-8 for all packets.

Therefore, survival time awareness may result in improved URLLC efficiency, which implies higher overall capacity (i.e. fewer resources reserved for URLLC), as well as improved overall reliability and latency for URLLC traffic, since the probability of resource conflict with other URLLC traffic is reduced at the system level. In addition, a larger number of URLLC devices may be supported when the survival time is known.

To provide a continuous service for the user of a UE, the UE may carry out a handover procedure, which may also be referred to as handoff, to change from one base station to another. For example, when a UE with an ongoing call or data session is moving away from an area covered by a first cell and entering an area covered by a second cell, the session may be handed over from the base station of the first cell to the base station of the second cell in order to avoid terminating or disrupting the session, when the UE gets outside the range of the first cell.

In the baseline handover procedure, the UE detaches from the source cell as soon as it receives the handover command from the source cell, and tries to synchronize with the target cell. During the time period between the UE's detachment from source cell and the consequent successful attachment to the target cell, the UE is unable to transmit or receive any packets. Therefore, the UE's survival time expiration should not take place during this time window, especially if the UE has already experienced some consecutive packet losses at the time of the handover trigger, and the survival time headroom is not high enough to accommodate the interruption caused during the handover.

Figure 3:
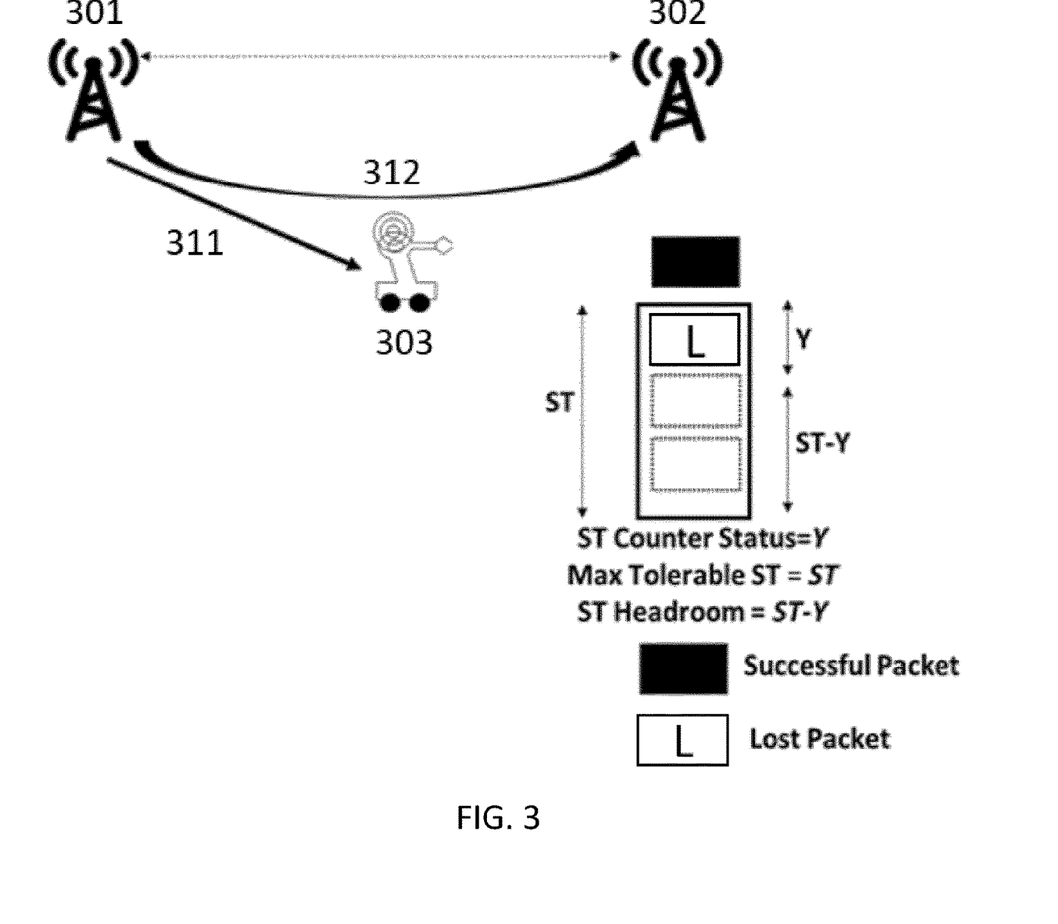
FIG. 3 illustrates survival time headroom.

FIG. 3 illustrates survival time headroom including mobility interruption time during handover. In the case of baseline handover procedures, UE traffic with survival time requirements may be negatively affected, if the survival time requirements are not considered as part of the handover procedure. For baseline handover schemes, both transmission and reception at the UE 303 are suspended on sending a handover command 311 from the source cell 301 to the UE 303, since the UE starts the handover execution immediately after receiving the handover command. The communication is resumed after the UE completes the random access channel (RACH) access at the target cell 302 and the handover complete message is sent. The time period, when the UE is unable to transmit or receive any data traffic during the handover, is referred to as the handover interruption time 312. In case the handover is started when the survival time headroom is too low, i.e. ST−Y<X, the handover would not be beneficial for the UE's survival time dependent traffic. ST denotes the maximum tolerable survival time requirement of the UE traffic, Y denotes the current survival time status, and X denotes the handover interruption time of the chosen mobility procedure. In other words, in this case the UE's survival time would expire during the handover interruption time, thus leading to negative impacts on the user's QoS and/or quality of experience (QoE). This may be relevant for example for mission-critical services, where the survival time expiration may cause the stopping of production and/or the triggering of safety measures.

Although FIG. 3 is presented in the context of the baseline handover procedure of NR Rel. 15, the above issue is applicable to other mobility procedures as well, such as the make-before-break (MBB) solution of LTE Rel. 14, the RACH-less handover, and the dual active protocol stack (DAPS) handover of NR Rel. 16.

Some exemplary embodiments may be used to make the mobility procedures aware of the UE's survival time for more robust handovers, and to avoid expiration of the UE's survival time during the handover execution. In some exemplary embodiments, the source cell considers the survival time requirements of the UE's services as well as the current status of the survival time headroom, while deciding the handover execution.

For example, for the baseline handover procedure, the source cell may adjust the transmission of the handover command, i.e. schedule the handover command, to the UE in order to match the UE's survival time requirements. As survival time is mainly relevant for deterministic traffic, the source cell knows the expected packet arrival times and the current status of the survival time, i.e. the consecutive packets already lost or the time left until the survival time expires. Thus, the source cell can make an estimation on whether the survival time could potentially expire, if it sends the handover command and the UE executes the handover immediately. Taking all this information into account, the source cell can adjust, or delay, the transmission of the handover command to the UE in order to allow some time for a successful packet transmission that would reset the survival time headroom. Once the survival time headroom is reset, the source cell can transmit the handover command to the UE, which then continues with the handover procedure.

Figure 4:
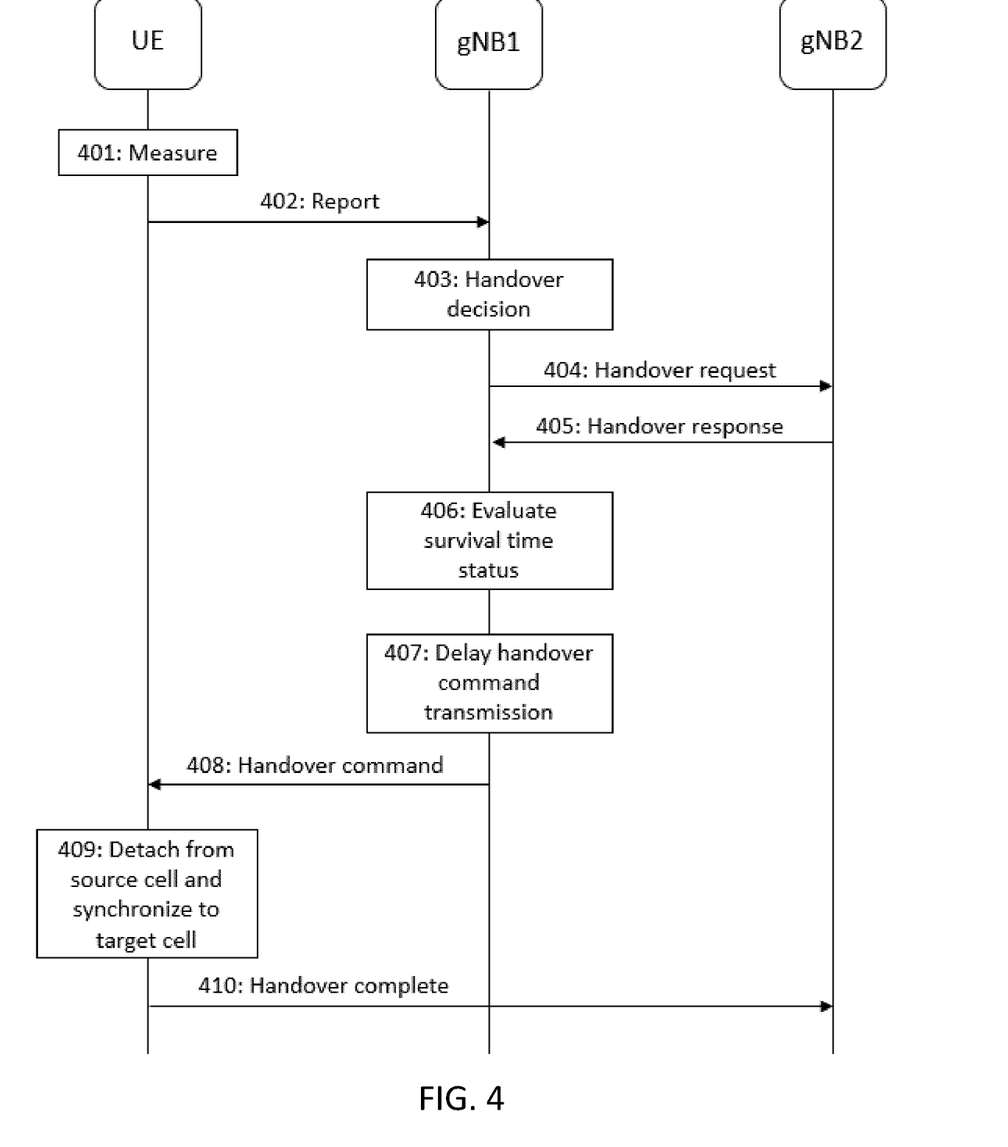
FIG. 4 illustrates a signaling diagram according to an exemplary embodiment.

FIG. 4 illustrates a signaling diagram according to an exemplary embodiment. A UE measures 401 the radio conditions associated with a source cell and a target cell, and reports 402 the set of radio measurements to a first base station associated with the source cell. The set of radio measurements may comprise, for example, signal-to-noise ratio (SNR), signal-to-interference-plus-noise ratio (SINR), channel quality indicator (CQI), reference signal received power (RSRP), and/or reference signal received quality (RSRQ).

The first base station decides 403, based on the set of radio measurements, to execute a handover to transfer the UE from the source cell to the target cell, and transmits 404 a handover request to a second base station associated with the target cell. The first base station and the second base station may be gNBs or functions of RAN, such as a centralized unit control plane (CU-CP), for example. The first base station receives 405 a handover response from the second base station indicating that the second base station is prepared for the handover.

The first base station evaluates 406 the survival time status of the UE, and it may determine to delay 407 the handover command transmission to the UE based at least partly on the survival time status. For example, the handover command transmission may be delayed, if $ST-Y \leq X$, where ST denotes the maximum tolerable survival time requirement of the UE traffic, Y denotes the current survival time status, and X denotes the handover interruption time of the handover procedure being used. Otherwise, i.e. if $ST-Y>X$, the handover command may be sent without delay. The first base station may also take into account additional information for deciding whether or not to delay the handover command. Examples of such additional information are presented in the following.

As a first example, the first base station may also take into account the UE's radio measurements of the source cell and the target cell in order to minimize the chances of radio link failures (RLF) caused by the introduced delay in the handover command transmission, and apply this delay when it is feasible from the perspective of the radio measurements. This prioritization between smooth mobility and service assurance may also be configured by the network operator, for example. The prioritization can be done, for example, by configuring delta values between the radio measurements of the source cell and the target cell. Higher delta values may indicate that the source cell can delay the handover even for larger differences between the radio signal strengths of the source and target cell, whereas lower delta values may indicate a more conservative approach, where the handover is delayed only if the difference between the source and target cell signal strengths is not too large. These delta values, i.e. thresholds, may also be different for different types of services and/or network slices. That is, the exemplary embodiments herein are exemplified for services; yet, the exemplary embodiments can also be applied to network slices, for example when a UE is associated with multiple network slices.

As a second example, if the UE is using multiple services with different survival time requirements and criticalities, the first base station may make the handover command transmission delay decision by considering also the requirements and the criticalities of the different services that the UE is currently using, as well as the priorities of the different services, which may be configured by the network operator.

As a third example, the first base station may also take into account the survival time requirements and the current status for both uplink and downlink traffic. For downlink traffic, the network has complete information as all the packets to be transmitted, or in the process of being transmitted, are inside the network. For uplink, the UE may provide some reports, for example on buffer status, which provide the network with information on which packets are pending uplink transmission and the survival time of those packets, in order for the network to be able to evaluate the survival time across both downlink and uplink.

As a fourth example, the first base station may also take into account the expected handover interruption time, depending on the type of handover procedure used, in order to determine the handover command transmission delay.

As a fifth example, different survival time headroom thresholds may also be defined for different services in order to decide when to delay the handover command transmission and when to not delay it. These thresholds may be different for uplink and downlink, and they may be configurable for example by the network operator in order to incorporate operator policies for different types of services.

The first base station then transmits 408 the handover command to the UE. The handover command may be comprised in a radio resource control (RRC) reconfiguration, for example. After receiving the handover command, the UE detaches 409 from the source cell and synchronizes to the target cell. The UE transmits 410 a handover complete message to the second base station.

It should be noted that the baseline handover procedure of NR Rel. 15 is used only as an example in the above exemplary embodiment. Some exemplary embodiments can also be applied to other handover mechanisms, where the handover execution is triggered by the serving cell by means of an RRC reconfiguration signaling comprising the handover command. Some examples of such other handover mechanisms may include the MBB, the RACH-less handover, the DAPS handover, and a combination of the MBB and the RACH-less handover.

Figure 5:
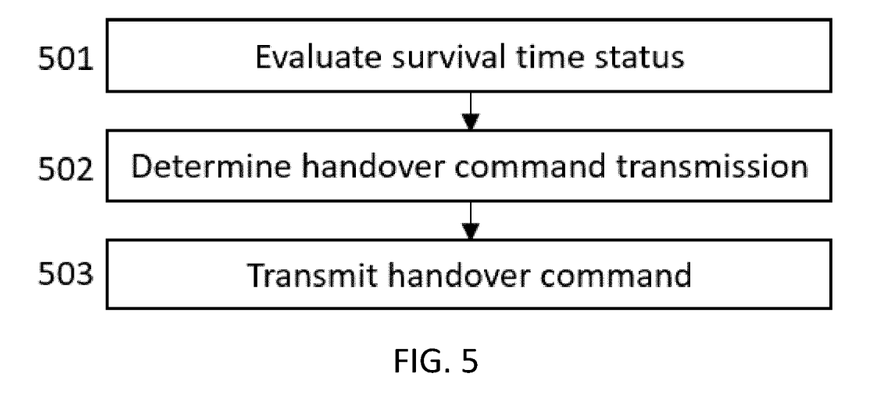
FIGS. 5-6 illustrate flow charts according to some exemplary embodiments.

FIG. 5 illustrates a flow chart according to an exemplary embodiment. The functions illustrated in FIG. 5 may be performed by an apparatus such as a base station. Referring to FIG. 5, a survival time status of a UE is evaluated 501. As a non-limiting example, the survival time status may be evaluated by checking a counter counting the number of consecutive packet errors or the time left until the survival time expires. A handover command transmission is determined 502 based at least partly on the survival time status. For example, the handover command transmission may be determined to be delayed, advanced, or transmitted immediately, for example when applying prediction-based mobility that may utilize artificial intelligence and/or machine learning algorithms. The handover command is transmitted 503 to the UE based on the determining.

Figure 6:
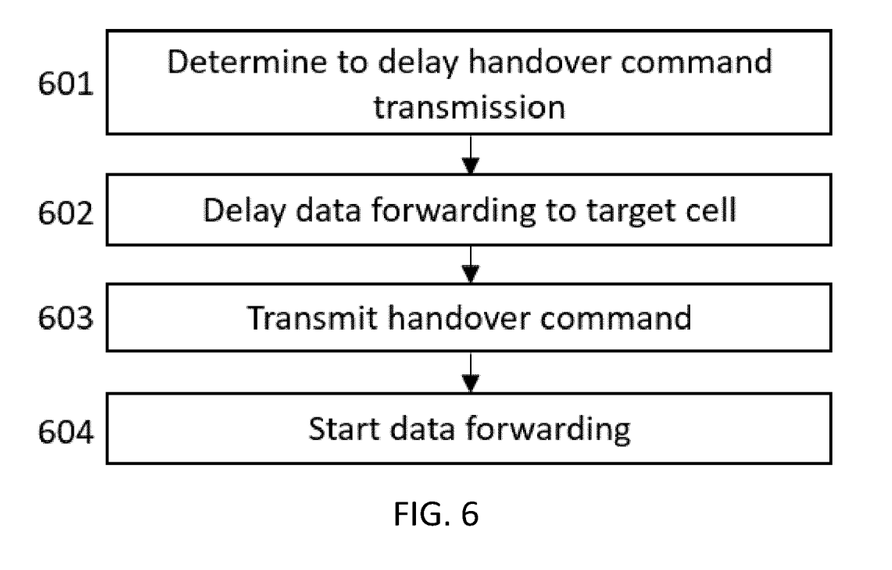

FIG. 6 illustrates a flow chart according to another exemplary embodiment. If the first base station, i.e. the source cell, determines 601 to delay the handover command transmission to the UE, then it may also delay 602 the data forwarding to the second base station, i.e. the target cell. Once the source cell transmits 603 the handover command to the UE, it starts 604 the data forwarding to the target cell and informs the target cell about the sequence number status transfer (SNST), wherein SNST indicates the first downlink or uplink packet to be transmitted or received by the target cell.

The functions and/or blocks described above by means of FIGS. 4-6 are in no absolute chronological order, and some of them may be performed simultaneously or in an order differing from the described one. Other functions and/or blocks may also be executed between them or within them.

A technical advantage provided by some exemplary embodiments is that they may enable robust mobility for survival time critical services. Some exemplary embodiments may ensure service continuity by avoiding survival time expiration during the handover procedure, which may be beneficial for example for URLLC use cases involving UE mobility. In other words, some exemplary embodiments may enable achieving the survival time requirements even during the UE mobility. By taking survival time into consideration in mobility, some exemplary embodiments may reduce service interruptions for survival time dependent services or time or latency critical services. Some exemplary embodiments may be used for baseline handovers as well as other kinds of handover procedures. Some exemplary embodiments may be used with UEs comprising one or more transmitters.

Figure 7:
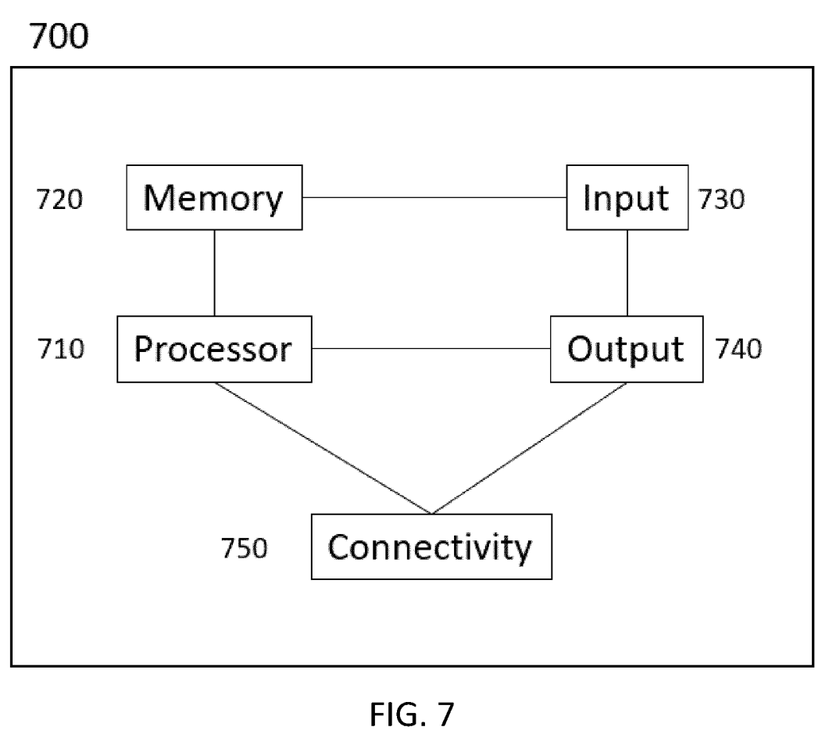
FIGS. 7-8 illustrate apparatuses according to some exemplary embodiments.

FIG. 7 illustrates an apparatus 700, which may be an apparatus such as, or comprised in, a terminal device, according to an exemplary embodiment. A terminal device may also be referred to as a UE herein. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are executed by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via an electromagnetic carrier signal and/or may be copied from a physical entity such as a computer program product. Execution of the computer readable instructions causes the apparatus 700 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 700 may further comprise, or be connected to, an input unit 730. The input unit 730 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 730 may comprise an interface to which external devices may connect to.

The apparatus 700 may also comprise an output unit 740. The output unit may comprise or be connected to one or more displays capable of rendering visual content, such as a light emitting diode (LED) display, a liquid crystal display (LCD) and/or a liquid crystal on silicon (LCoS) display. The output unit 740 may further comprise one or more audio outputs. The one or more audio outputs may be for example loudspeakers.

The apparatus 700 further comprises a connectivity unit 750. The connectivity unit 750 enables wireless connectivity to one or more external devices. The connectivity unit 750 comprises at least one transmitter and at least one receiver that may be integrated to the apparatus 700 or that the apparatus 700 may be connected to. The at least one transmitter comprises at least one transmission antenna, and the at least one receiver comprises at least one receiving antenna. The connectivity unit 750 may comprise an integrated circuit or a set of integrated circuits that provide the wireless communication capability for the apparatus 700. Alternatively, the wireless connectivity may be a hardwired application specific integrated circuit (ASIC). The connectivity unit 750 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 700 may further comprise various components not illustrated in FIG. 7. The various components may be hardware components and/or software components.

Figure 8:
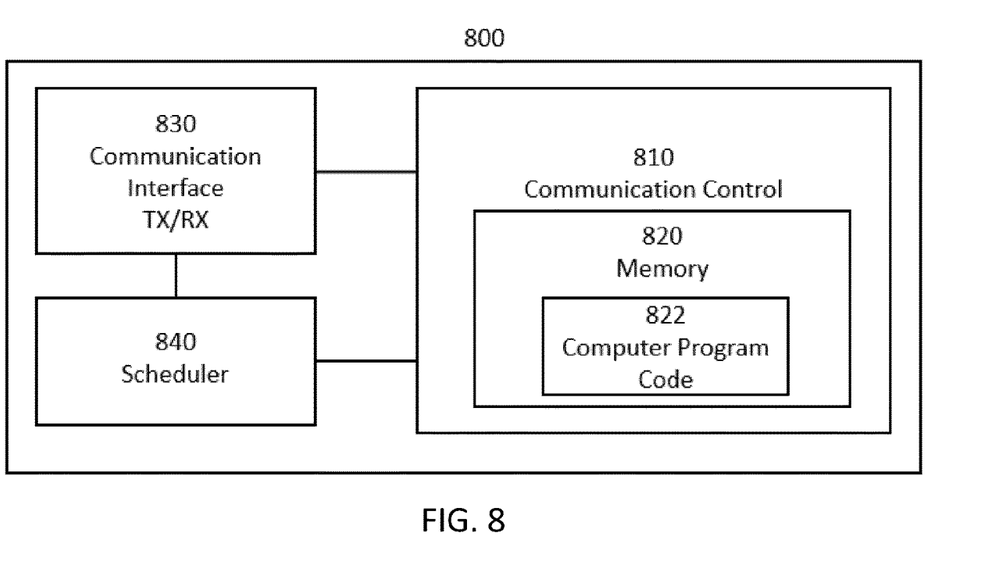

The apparatus 800 of FIG. 8 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 800 may be an electronic device comprising one or more electronic circuitries. The apparatus 800 may comprise a communication control circuitry 810 such as at least one processor, and at least one memory 820 including a computer program code (software) 822 wherein the at least one memory and the computer program code (software) 822 are configured, with the at least one processor, to cause the apparatus 800 to carry out some of the exemplary embodiments described above.

The memory 820 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 800 may further comprise a communication interface 830 comprising hardware and/or software for realizing communication connectivity according to one or more communication protocols. The communication interface 830 comprises at least one transmitter (TX) and at least one receiver (RX) that may be integrated to the apparatus 800 or that the apparatus 800 may be connected to. The communication interface 830 provides the apparatus with radio communication capabilities to communicate in the cellular communication system. The communication interface may, for example, provide a radio interface to terminal devices. The apparatus 800 may further comprise another interface towards a core network such as the network coordinator apparatus and/or to the access nodes of the cellular communication system. The apparatus 800 may further comprise a scheduler 840 that is configured to allocate resources.

As used in this application, the term "circuitry" may refer to one or more or all of the following:
- a. hardware-only circuit implementations (such as implementations in only analog and/or digital circuitry) and
- b. combinations of hardware circuits and software, such as (as applicable):
  - i. a combination of analog and/or digital hardware circuit(s) with software/firmware and
  - ii. any portions of hardware processor(s) with software (including digital signal processor(s)), software, and memory(ies) that work together to cause an apparatus, such as a mobile phone, to perform various functions) and
- c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:
   evaluate a survival time status of a terminal device;
   determine a handover command transmission based at least partly on the survival time status;
   determine to delay the handover command transmission based on determining that a difference between a survival time requirement and the survival time status is less than or equal to an estimated handover interruption time; and
   in response to the delay, transmit the handover command to the terminal device.

2. The apparatus according to claim 1, wherein the apparatus is further caused to delay data forwarding to a target base station, based on the determining to delay the handover command transmission.

3. An apparatus comprising at least one processor, and at least one memory including computer program code, wherein the at least one memory and the computer program code are configured, with the at least one processor, to cause the apparatus to:
   evaluate a survival time status of a terminal device;
   determine a handover command transmission based at least partly on the survival time status and one or more survival time headroom thresholds; and
   transmit the handover command to the terminal device based on the determining.

4. The apparatus according to claim 3, wherein the one or more survival time headroom thresholds comprise a first survival time headroom threshold for uplink communication and a second survival time headroom threshold for downlink communication.

* * * * *